United States Patent [19]

Muschiatti

[11] Patent Number: 5,110,998
[45] Date of Patent: May 5, 1992

[54] HIGH SPEED INSULATED CONDUCTORS

[75] Inventor: Lawrence C. Muschiatti, Wilmington, Del.

[73] Assignee: E. I. du Pont de Nemours and Company, Wilmington, Del.

[21] Appl. No.: 647,889

[22] Filed: Jan. 30, 1991

Related U.S. Application Data

[63] Continuation-in-part of Ser. No. 476,333, Feb. 7, 1990, abandoned.

[51] Int. Cl.$^5$ .................................. H01B 7/02
[52] U.S. Cl. .................... 174/24; 174/25 G; 174/26 G; 174/110 F
[58] Field of Search .............. 174/24, 25 R, 25 G, 174/26 G, 110 F

[56] References Cited

U.S. PATENT DOCUMENTS

| | | | |
|---|---|---|---|
| 3,309,458 | 3/1967 | Yoshimura et al. | 174/107 |
| 3,332,814 | 7/1967 | Yoshimura et al. | 174/28 |
| 3,375,211 | 3/1968 | Parish | 264/41 |
| 3,584,090 | 6/1971 | Parrish | 264/53 |
| 3,953,566 | 4/1976 | Gore | 264/154 X |
| 4,096,227 | 6/1978 | Gore | 264/122 X |
| 4,104,481 | 8/1978 | Wilkenloh et al. | 174/110 F X |
| 4,107,354 | 8/1978 | Wilkenloh et al. | 174/102 R X |
| 4,204,086 | 5/1980 | Suzuki | 174/110 F |
| 4,304,713 | 12/1981 | Perelman | 521/98 X |
| 4,368,350 | 1/1983 | Perelman | 174/110 F X |
| 4,379,858 | 4/1983 | Suzuki | 521/134 X |
| 4,701,370 | 10/1987 | Park | 264/210.7 X |
| 4,877,815 | 10/1989 | Buckmaster et al. | 521/85 |
| 4,894,488 | 1/1990 | Gupta | 174/28 |

FOREIGN PATENT DOCUMENTS

| | | |
|---|---|---|
| 211505 | 2/1987 | European Pat. Off. . |
| 35355 | 5/1973 | Japan . |
| 167201 | 12/1981 | Japan . |
| 2143237 | 2/1985 | United Kingdom . |

OTHER PUBLICATIONS

Autorenkollektiv "Kabel und Leitungsfertigung", VEB Verlag Technik, Berlin, 1976, pp. 24–25.

Primary Examiner—Morris H. Nimmo

[57] ABSTRACT

An electrically insulated conductor comprising an electrically conductive element surrounded by ultramicrocellular foamed polymer insulation having a void volume greater than about 75%, wherein the transmission speed of the insulated conductor is greater than 90% of the speed of light. Such insulated conductors are useful in computer and telecommunications applications.

12 Claims, 1 Drawing Sheet

HIGH SPEED INSULATED CONDUCTORS

This is a continuation-in-part of application Ser. No. 07/476,333 filed Feb. 7, 1990, now abandoned.

BACKGROUND OF THE INVENTION

In air, metallic conductors are capable of transmitting electrical impulses at speeds approaching the speed of light. However, bare conductors are not used in most applications due to the need to mechanically support the conductors and hazards such as shorting, shocking and fire which can occur when other materials are too close to or directly contact electrically transmitting conductors. To avoid such problems and hazards, conductors have been surrounded by nonconducting insulation. On an atomic level, this insulation contains charges which can be polarized and interact with the electrical impulse traveling along the conductor. This interaction retards the flow of the electrical impulse through the conductor and limits the velocity of propagation of the electrical impulse transmitted.

The dielectric constant, K, of a material is a measure of the polarizability of the charges within the material. As the dielectric constant increases, the velocity of propagation of an electrical impulse traveling along a conductor surrounded by the higher K material decreases. Conversely, as the dielectric constant decreases towards 1.0, the dielectric constant of air, the velocity of propagation of an electrical impulse traveling along a conductor surrounded by the lower K material approaches the speed of light. Conventional insulation has a dielectric constant significantly greater than that of air. Consequently, conductors within such conventional insulation transmit electrical impulses at speeds lower than those of a bare conductor in air.

Recent advances in the capabilities of computers and telecommunications demand higher velocities of propagation over insulated conductors. Various insulating materials and configurations have been disclosed but there is still a need for an insulated conductor that can transmit electrical signals at speeds close to the speed of light.

Yoshimura et al., U.S. Pat. Nos. 3,309,458 and 3,332,814, and Japanese patent publication JP 73/35355 disclose foamed polystyrene insulation. In the Yoshimura et al. patents, the foamed polystyrene is hard and brittle, can have up to 97% greater volume than the unfoamed polystyrene and a dielectric constant as low as 1.03. The foamed polystyrene is adhered to flexible polyethylene tape to compensate for the inflexibility of the polystyrene. The flexible tape/foamed polystyrene construct is used as the insulation between the two conductors in a coaxial cable.

Japanese patent publication JP 73/35355 discloses an insulated wire produced by extrusion coating a conductor with an insulative foam composition consisting of polystyrene, a blowing agent and water. The percentage of voids in the foam insulation is 90.6%.

Wilkenloh et al., U.S. Pat. No. 4,107,354, and Japanese patent publication JP 56/167201 disclose foamed polyolefin insulation. Wilkenloh et al. disclose a coaxial cable in which the core conductor is coated with a dielectric having a dielectric constant in the range of 1.32 to 1.1. The dielectric comprises an extruded cellular polyethylene or polypropylene which has been rendered cellular by direct injection of a blowing agent in a liquid form into the polymer during extrusion. The resulting polyolefin has a foam density between 0.10 and 0.21 grams/cubic centimeter (g/cc).

Japanese patent publication JP 56/167201 discloses an insulated wire comprising foamed polyolefin extruded onto a conductor. The foamed polyolefin is a copolymer of ethylene and alpha-olefin having more than four carbon atoms, containing a foaming agent. The starting (unfoamed) copolymer has a density of 0.926 to 0.960 g/cc. The extruded polyolefin has a foamed percentage of 82%.

Suzuki, U.S. Pat. No. 4,379,858 discloses a copolymer resin matrix containing porous fragments dispersed therein. The resin matrix comprises a tetrafluoroethylene-perfluoroalkyl vinyl ether copolymer. The porous fragments have a porosity of 40–90% and are selected from the group consisting of polytetrafluoroethylene (PTFE), polyethylene, and polypropylene. Air trapped in the fragments expands during melt molding to form bubbles in the matrix. The product is suitable for insulating wire or cable.

Perelman, U.S. Pat. Nos. 4,304,713 and 4,368,350, and British patent publication GB 2,143,237 disclose foamed fluoropolymers as electrical insulation. Perelman discloses a foamed melt extrudable perfluorinated ethylene-propylene polymer containing a PTFE nucleating agent. Preferably, the foamed perfluoropolymer resin has a closed cellular structure with cells ranging in size from 10 to 40 mils (0.25–1.02 mm), a foamed density as low as 1.0 g/cc, and an insulation loss of less than 1.8 db/100 ft. at 1000 MHz. The foamed resin can be used to make jacketed electrical conductors and/or coaxial cables wherein at least one conductor is bonded to the foamed melt extrudable resin.

British patent publication GB 2,143,237 discloses foamed fluoropolymer insulation which is melt-extrudable onto a wire in a process for making lightweight coaxial cable. Preferred foamed insulation has a reported void level of 65%.

European patent publication EP 211,505 and Gore, U.S. Pat. Nos. 3,953,566 and 4,096,227, disclose porous PTFE insulation. EP 211,505 discloses a flexible, high voltage electrically insulating tape comprising a tape of expanded porous PTFE having a fluoroelastomer impregnated within the pores thereof at at least one surface of the PTFE tape. The impregnated porous PTFE has a dielectric constant as low as 1.3. The fluoroelastomer is filled in the surface pores to prevent the internal open-cells from being crushed by external forces. To insulate a wire or cable, the modified PTFE tape is spirally wound on or longitudinally attached to the conductor.

In U.S. Pat. Nos. 3,953,566 and 4,096,227, Gore discloses an expanded, amorphous-locked PTFE useful as an electrical insulator. The PTFE has an amorphous content exceeding about 5% and a microstructure characterized by nodes interconnected by fibrils (i.e. open cells). The expanded PTFE insulation in a coaxial cable has a dielectric constant of 1.2 to 1.8.

SUMMARY OF THE INVENTION

The invention is directed to an electrically insulated conductor comprising an electrically conductive element surrounded by ultramicrocellular foamed polymer insulation having a void volume greater than about 75%, wherein the velocity of propagation of the insulated conductor is greater than 90% of the speed of light.

The invention is also directed to a cable comprising a plurality of the above electrically insulated conductors.

The invention is further directed to a method for fabricating the above electrically insulated conductor.

DETAILED DESCRIPTION OF THE INVENTION

Figure 1:
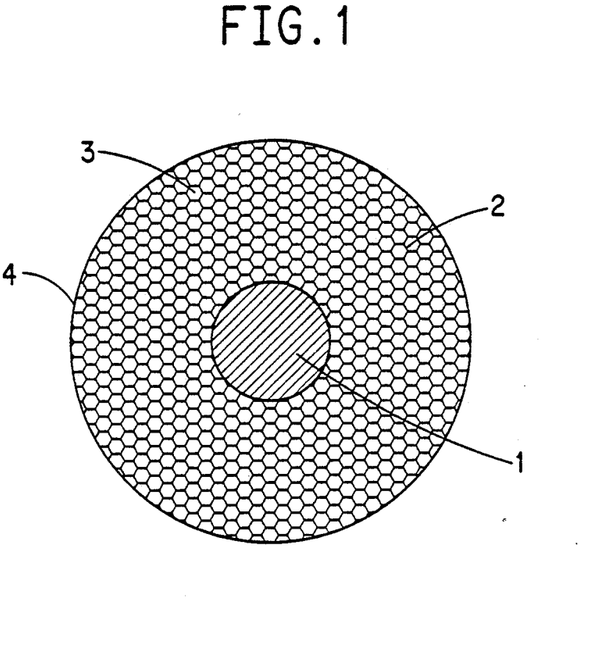
FIG. 1 is a cross-sectional view of an insulated conductor of the invention.
Figure 2:
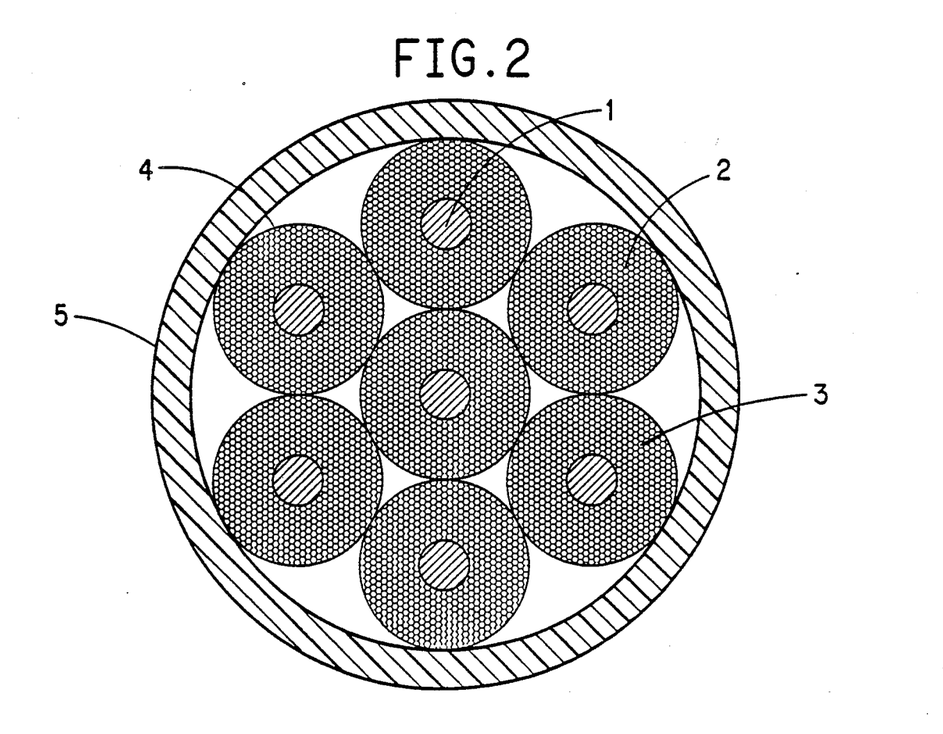
FIG. 2 is a cross-sectional view of a cable of the invention.

The electrically conductive element of the invention 1, in FIGS. 1, and 2 is typically a wire of relatively small median diameter. Metals such as copper, copper alloys, aluminum and materials plated with metals such as tin, silver, copper or nickel are suitable as wires, whether stranded or solid. Copper is a preferred wire material. The median diameter of the wire may range from about 0.00049 inch to about 0.032 inch (AWG 56 to AWG 20) (0.01–0.81 mm) and are preferably in the range of about 0.006 to about 0.013 inch (0.15–0.33 mm).

The ultramicrocellular foamed polymer 4, in FIGS. 1 and 2 which insulates the wire has a void volume greater than about 75%, preferably greater than 85%, and more preferably greater than 94%. Suitable ultramicrocellular foamed polymers are disclosed by Parrish in U.S. Pat. Nos. 3,375,211 and 3,584,090 and Bonner in U.S. Pat. Nos. 3,503,907 and 3,696,181, all of which are hereby incorporated by reference. This ultramicrocellular structure is composed of a high molecular weight synthetic crystalline, semi-crystalline, or amorphous polymer and has a major proportion of closed polyhedral cells 3, in FIGS. 1 and 2 defined by air permeable walls 2, in FIGS. 1 and 2, having a thickness of less than 2 microns with essentially all the polymer constituting cell walls and exhibiting uniform texture and uniplanar orientation. To achieve the desired void volume, the ultramicrocellular polymer cells must, at some point, contain an inflatant whose permeability coefficient for diffusion through said walls is less than that of air, the inflatant being capable of generating a vapor pressure of at least 30 mm Hg ($4.00 \times 10^3$ Pa) at a temperature below the softening point of said polymer.

Since the polymer walls of the final ultramicrocellular structure are film-like with a thickness of less than 2 microns, the polymer must accordingly be of at least film-forming molecular weight. Additionally, the polymer must impart sufficient strength to the ultramicrocellular structure that the particular cellular nature thereof not be destroyed upon inflation, e.g. so as to resist rupture of a significant stretching of the cell walls. For this reason, the polymer should have a yield strength of at least 1000 psi ($6.89 \times 10^6$ Pa) as measured by the test method of ASTM D638-58. On the other hand, for inflation to occur such that desired void volume levels are obtained, the polymer composed structure must be such that in expanded condition it be "yieldable," e.g. resilient such that substantial deformation occurs under internal-external pressure differentials, meaning differences, of one atmosphere or less (since this is the order of magnitude of the pressure differentials available for collapse and inflation). By substantial deformation is meant that the ultramicrocellular structure in expanded condition, i.e. having an internal pressure of at least about one atmosphere, is yieldable such that its volume can be compressed by at least 10% under a load of 10 pounds per square inch ($6.89 \times 10^4$ Pa) and recover at least about 50% of its original volume on release of the load. Structures which do not compress to that extent are entirely too rigid and hence do not afford a sufficient degree of resiliency to respond to pressure differentials. Moreover, if it does not sufficiently recover after release of the load, then it is not sufficiently flexible to resist fracturing and rupturing of the cell walls.

An essential feature of the polymer which constitutes the cell walls is that it exhibits selective permeability to different gases; in particular, be permeable with respect to air but less permeable with respect to inflatant vapors. Without this feature efforts to achieve full expansion would be unsuccessful because the inflatant would be prematurely lost before sufficient air had entered the cells. The class of crystalline, crystallizable and amorphous polymers of the invention is well suited for achieving this function, crystalline and crystallizable polymers being particularly well suited.

Examples of synthetic organic polymers suitable for producing ultramicrocellular structures include the class of synthetic, crystalline and crystallizable, organic polymers, e.g. polyhydrocarbons such as linear polyethylene, polypropylene, stereo-regular polypropylene or polystyrene; polyethers such as polyformaldehyde; vinyl polymers such as polyvinylidene fluoride; polyamides both aliphatic and aromatic, such as polyhexamethylene adipamide and the polyamide from 2,2-bis p-aminophenyl propane and isophthalic acid; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate, and equivalents; and the class of synthetic, amorphous, organic polymers, e.g. polyvinylchloride; and copolymers of perfluoro-2,2-dimethyl-1,3-dioxole with one or more fluoro-containing monomers such as tetrafluoroethylene. The polymers should have a softening point of at least about 40° C.

One of the features of the ultramicrocellular structures is the high degree of orientation of the polymer in the cell walls, which contributes to the unique strength of these structures. Therefore, a preferred class of polymers includes those materials which respond to an orienting operation by becoming substantially tougher and stronger. This class of polymers is well known to one skilled in the art and includes, for example, linear polyethylene, polypropylene, polyethylene terephthalate and copolymers thereof.

As is clear from the foregoing disclosure, the polymers suitable for use in preparing the cellular structures of this invention must have a reasonable permeability to air at room temperature, e.g. have a diffusion coefficient of at least $10^{-13}$ cc/cm$^2$/sec/cm/cm Hg (cc is the volume of gas at STP (Standard Temperature and Pressure), cm$^2$ is surface area, cm is sample thickness, and cm Hg is the pressure difference across the sample).

The ultramicrocellular polymer is generated from a polymer solution comprising polymer, solvent and, optionally, inflatant. The solvent, in addition to dissolving the polymer at elevated temperature and pressure, generates the cells within the polymer upon adiabatic expansion. To achieve this, the solvent must fulfill the following criteria:

(a) the solvent should have a boiling point of at least 25° C. and preferably at least 60° C. below the melting point of the polymer used;

(b) the solvent should be substantially unreactive with the polymer and inflatant during mixing and flash spinning; and (c) The solvent should form a solution which will undergo rapid vaporization upon discharge into an atmosphere of air at ambient temperature and pressure.

Solvent liquids which have been found suitable for the invention include methylene chloride, fluorotrichloromethane, 2,2-dimethylbutane, pentane, hexane, and methanol.

It may be desirable at times to include in the polymer solution a nucleating agent, such as carbon dioxide, nitrogen, a silicate, a mixture of silicates or a saturated aliphatic or cycloaliphatic compound having at least one fluorine to carbon covalent bond and more fluorine atoms than carbon atoms in order to give increased nucleation.

The function of the inflatant, whether present in the polymer solution or incorporated into the cells of the ultramicrocellular polymer, is to afford an osmotic driving force which is capable of causing inflation of the cellular structure. Accordingly, such inflatant must be "relatively impermeant" by which is meant that at 25° C. its permeability coefficient for diffusion through the cell walls be lower than that of air. Thus, the vapors of the inflatant must be incapable of permeating the cell walls, e.g. outwardly from the sample, as fast as air can permeate the cell walls, e.g. into the sample, for otherwise full inflation of the cells could not be achieved upon continued exposure of the sample to an air atmosphere. An impermeant inflatant is one whose permeability coefficient for diffusion through the cell walls is not only lower than that of air but also is incapable of permeating the same cell walls at room temperature, e.g. below 40° C., at such a rate that half or more thereof will escape to an air atmosphere by diffusion within one day's time, preferably one month's time or longer. The latter guarantees in effect that the structure, whether collapsed or not, will retain its inflation activator (the impermeant inflatant) for a reasonable storage period.

The minimum quantity of inflatant contained in each cell is of significance in realizing an adequate osmotic driving force to obtain reliable and reasonably rapid self-inflation to the fullest extent. Thus, a major number of the cells should contain at least some quantity of the inflatant. Since the inflatant must exist in a gaseous condition to create an osmotic driving force, it must be either a gas at room temperature or be capable of vaporizing at a temperature below the melting point of the synthetic polymer defining the walls. In practice, it has been found that the inflatant must be capable of generating a vapor pressure of at least 30 mm Hg ($4.00 \times 10^3$ Pa) at a temperature below the softening point of the polymer in order to reliably provide well defined cavities into which the external air will diffuse in reasonable periods of time. Therefore, if the vapor pressure of the inflatant in partially collapsed (i.e. less than completely inflated) cells is at least 30 mm Hg ($4.00 \times 10^3$ Pa) at room temperature, the structure will normally self-inflate in air as desired. However, inflatants whose vapor pressures are less than 30 mm Hg ($4.00 \times 10^3$ Pa) at room temperature may also be successfully employed although frequently an added step of briefly heating the structure, above room temperature but below the polymer softening point, to increase the partial pressure of the inflatant, will assist in reducing the time necessary for full inflation to occur.

Higher internal inflatant pressures are of course operable, and are in fact preferred, particularly when the confining cellular structure has walls near the upper thickness limit (2 microns) or when the polymer comprising the walls possesses a high flexural modulus (above 100,000 psi ($6.89 \times 10^8$ Pa)) at room temperature.

The rate of permeation for an inflatant through a given polymer increases as its diffusivity and solubility increase. Accordingly, candidates for inflatants should have as large a molecular size as is consistent with the required 30 mm Hg ($4.00 \times 10^3$ Pa) minimum vapor pressure, and have little solvent power or affinity for the confining polymer cell walls. A preferred class of such inflatants is exemplified by compounds whose molecules have chemical bonds different from those found in the confining polymer, a low dipole moment, and a very small atomic polarizability. Furthermore, it is advantageous, though not necessary, that the inflatant be a high vapor pressure solid or liquid under ambient conditions in order that small quantities of solid or liquid phase inflatant may be present in each partially collapsed cell, in addition to the inflatant vapor. For such systems the inflatant vapor is replenished from the solid or liquid inflatant "reservoir" as the collapsed structure inflates, thus maintaining the full osmotic driving force up through the stage of full inflation. Materials which are non-gaseous at room temperature and atmospheric pressure are preferred since for a given weight they occupy less volume; hence, the bulk of uninflated structures can be appropriately minimized. Products containing the normally liquid or solid inflatants need at most only be heated in the atmosphere to vaporize a part of the inflatant and to thereby spontaneously cause inflation.

Suitable inflatants are selected from the group consisting of sulfur hexafluoride and saturated aliphatic and cycloaliphatic compounds having at least one fluorine to carbon covalent bond and wherein the number of fluorine atoms exceeds the number of carbon atoms. Preferably, the saturated aliphatic and cycloaliphatic compounds are, respectively, perhaloalkanes and perhalocycloalkanes in which at least 50% of the halogens are fluorine. Although the aliphatic and cycloaliphatic inflatants may contain ether-oxygen linkages, they are preferably free of nitrogen atoms, carbon to carbon double bonds and reactive functional groups. Specific examples of inflatants include difluoroethane, tetrafluoroethane, sulfur hexafluoride, chlorotrifluoromethane, dichlorodifluoromethane, $CF_3CF_2CF_2OCFHCF_3$, 1,1,2-trichloro-1,2,2-trifluoroethane, symdichlorotetrafluoroethane, perfluorocyclobutane, perfluoro-1,3-dimethylcyclobutane, and perfluorodimethylcyclobutane isomeric mixtures. Mixtures of two or more inflatants can often be used to advantage.

Aside from the foregoing characteristics, it will be understood that the inflatants must be inert, i.e., be thermally stable under process conditions, and chemically and hydrolytically stable under ambient conditions.

To fabricate an insulated conductor such as a wire, the polymer solution containing polymer, solvent, and optionally, inflatant, nucleating agent and/or other additives (flame retardants, colorants, etc.) is flash spun over a moving wire in air at ambient temperature and pressure. Surprisingly, the foamed polymer coats the wire thoroughly and retains advantageous properties of the ultramicrocellular structure such as the small, substantially uniform closed cells made up of thin oriented cell walls and narrow cell size distribution. These properties of the ultramicrocellular structure result in high tenacity, flexible, pneumatic foam coatings with very high void volume levels, high internal pressures, very low foam densities and velocities of propagation along the insulated conductor greater than 90% the speed of light, preferably greater than 95% the speed of light. It is even more surprising, but yet essential that the advantageous properties of the ultramicrocellular structure are retained when the ultramicrocellular polymer is coated in very thin annuli over small diameter wires, for example, when making insulated wires having outer median diameters smaller than 0.050 inch (1.27 mm) and annular insulation thicknesses less than 0.020 inch (0.51 mm).

Two methods, autoclave spinning and extrusion spinning, are suitable for making insulated conductors of the invention. Both methods form a polymer solution under elevated temperature and pressure than pass the solution into a region of lower temperature and pressure (normally room temperature at about one atmosphere), thereby flashing the solution, and coat the foamed material onto a moving wire.

In autoclave spinning, an autoclave of predetermined volume is blanketed with an inert atmosphere such as nitrogen and filled up to 90% capacity with an admixture of polymer, solvent, and optionally, inflatant, nucleating agent and/or other additives for specific end uses. The volume of the autoclave is dependent upon factors such as the length of the wire to be insulated, the size of the wire, the desired insulation thickness, the stability of the polymer and the acceptable residence time for the particular polymer solution. One liter and three liter autoclaves are typical but smaller and larger sizes have been used to spin ultramicrocellular foams.

To form a solution, the admixture is heated to dissolve the polymer, the pressure in the autoclave is increased to greater than the vapor pressure of the solvent and the admixture is agitated. Some polymers and solvents are dried before being added to the autoclave to prevent molecular weight degradation during the solution formation and the coating (or spinning) process.

Once the solution is formed, the solution temperature is lowered to the desired spin temperature. The spin temperature is dependent upon a number of variables including polymer type, solvent type, solution composition, polymer concentration, polymer solubility, sintering point (e.g., point at which the polymer is above its melting point and a majority of the solvent is evaporated), desired foam density and spinning speed.

The bottom of the autoclave may be fitted with a screen pack holder which contains a breaker plate and a set of screens (screen pack) to both filter out unwanted particulate matter and create back pressure on the solution remaining in the autoclave as the polymer solution exits the autoclave. One to three screens are generally used with mesh size depending on the shear sensitivity and viscosity of the solution to be spin-coated. A typical screen pack would include a 100-, a 200-, and a 325-mesh (149, 74 and 44 micron) screen. The breaker plate holds the screen pack in place. The pressure above the solution is maintained (e.g., with an inert gas such as nitrogen) to prevent the solution from boiling and to push the solution through the system.

After exiting the autoclave, and passing through the screen pack, if one is provided, the solution is flashed and coated onto the wire. This step requires a means for flashing the solution, a means for moving the wire and a means for coating the flashed solution over the moving wire. To assure a uniform coating, a means for controlling the flow of the solution can be included. For example, as the solution exits the autoclave, it can be channeled to a metering valve which controls the flow of the solution. Alternatively, the metering valve can be incorporated into the piece of equipment which houses the flashing means, e.g. a crosshead, and after the solution exits the autoclave, it can be channeled directly to the crosshead. It may also be desirable to channel the solution from the autoclave to a holding tank or an accumulator before flashing. An accumulator can follow a metering valve or, in the absence of a metering valve, the accumulator can include a means for controlling the flow of the solution such as a moving piston which also controls the pressure drop across the flashing means. In the absence of an accumulator, an inert gas, such as nitrogen, can be used to control the pressure drop across the flashing means. In a typical process configuration, the solution exits from the bottom of the autoclave in a vertical direction and the moving wire travels in a horizontal plane. A crosshead, which can be fitted to either the screen pack holder, valve or accumulator, can be used to turn the solution in the direction of the moving wire and also to hold the wire coating tips and dies (spinnerets). The design of the crosshead varies and may be simple or complex depending on the rheology of the solution to be spun onto the wire. The diameter of the flow path can vary, but, is generally about one quarter of an inch ($\frac{1}{4}$ in (6.35 mm)) to about one half of an inch ($\frac{1}{2}$ in (12.7 mm)) at the entrance to the tip or die. If necessary, the crosshead can be designed by conventional methods for constant velocity flow of the solution.

The tips and dies used are typical of those used in wire coating operations and/or fiber spinning. Designs vary in overall length, orifice diameter, internal angle size, entrance angle number and size, and land length. These geometrical factors are chosen on the basis of solution rheology, solvent flashing characteristics, wire size, and coating thickness. Extensions of various inside diameters and lengths can be added to the die to control the rate of solvent evaporation during flashing and alter the environment (air, solvent vapor, $N_2$, etc.) and pressure at the surface of the flashing solution. Either pressure or tubing tip/die setups can be used. In a pressure tip/die setup, the flashed material contacts the wire under pressure in the die so that a coated wire exits the die. In a tubing tip/die setup, the wire passes through a tube of material as the material and wire exit the die. Outside of the die, the tube of material collapses onto the wire in the presence of a vacuum.

The means for moving the wire can include: a low tension wire payoff or spool which holds the wire and feeds it to the coating process, a high speed wire preheater to raise the temperature of the wire to a temperature compatible with the coating material, a wire wipe to clean the wire, a wire straightener, a capstan to control the rate of speed of the wire through the coating and takeup stages and a takeup or spool which collects the coated wire. Both reel and coil type takeups can be used.

The entire solution handling system up to and including the crosshead/tip/die is heated and/or insulated to maintain the desired spin temperature. Pressure and temperature can be monitored at various points along the flow path.

Depending on the polymer type, the composition of the spin mix and the spinning conditions (amount of polymer, temperature, pressure, crosshead/die geometry, etc.), the foamed polymer insulation coated onto the wire by the foregoing process may deflate somewhat. Typically, such deflation occurs when inflatant escapes from the cells of the insulation at a rate faster than air permeates through the cell walls and into the cells. When deflation does occur, the coated wire collected on the takeup may need to be re-inflated to minimize the foam density and maximize flexibility, pneumaticity and velocity of propagation. Additionally, when the polymer solution that is coated onto the wire by the foregoing process does not include inflatant, the polymer coating must be treated with inflatant to produce an electrically insulated conductor of the invention.

The re-inflation or post-spinning inflation step involves immersing the insulated wire in solutions of 10 to 100 wt. % inflatant in a solvent. With solutions containing less than 100% inflatant, the submerged wire is removed from the inflatant solution and quickly immersed in about 60°–70° C. water to remove the solvent, then dried in an oven or in air. When 100% inflatant is used, the wires are simply dried in air or in an oven. This process can be carried out either as a batch or continuous process and can be performed as a step in the flash spinning process between the wire coating operation and the takeup, e.g., between the crosshead and capstan or as a distinct second process utilizing the coated wire collected from the flash spinning process as the feed.

As the inflatant, liquid nitrogen, partially halogenated and fully halogenated chlorofluorocarbons, and hydrocarbons have been used in fiber spinning and should be applicable to this process. Solvents such as methylene chloride are suitable. Inflatant solution composition, immersion time/temperature, and drying time/temperature are dictated by the nature of the ultramicrocellular foam being inflated and the composition of the original spin mix. In some cases, immersion in inflatant solution is not necessary and re-inflation to optimum density can be accomplished by simply heating the ultramicrocellular foam coated wire for several minutes at a temperature exceeding the boiling point of the solvent or inflatant. Immersion temperatures higher than ambient and pressures greater than or lower than ambient have been employed to inflate fibers and can be used in the process.

In the extrusion spinning method, pellets of polymer are melted in the appropriate size extruder and the polymer melt is metered into an extruder mixer. A metering pump supplies solvent to the extruder mixer in appropriate amounts. After mixing, the homogeneous solution is metered through a screen pack assembly similar to that used in the autoclave spinning operation, to a crosshead/tip/die assembly through which the wire passes. The crosshead/tip/die assembly, wire handling and re-inflation processes are essentially the same as those used with the autoclave.

The system is heated and/or insulated to obtain and maintain the desired spin temperature. Spin pressures and solution flow can be controlled with mixing extruders, gear pumps and valves. The mixing screw can be selected from one of the many available commercial or propietary designs. Static mixers can also be used in place of the extruder mixer.

Other extruder/mixer configurations are also acceptable. Long, 40 to 1 (length to diameter) or greater extruders can be fitted with various screws, mixing sections and heat exchangers. In such systems, the pellets of polymer enter the feed hopper of the extruder and are converted to a melt in the transition section of the screw. Solvent is injected in either the transition or more preferably the first metering section of the screw. A mixing section follows which can be part of the screw, static or any combination of the two. After being mixed to form a homogeneous solution, the solution can be metered to the flashing and coating means, such as a crosshead/tip/die assembly, through a second metering section on the screw, which is long enough to accomplish the necessary heat transfer to cool the solution to the desired temperature, or through a heat transfer section into a gear pump.

As an alternative to the foregoing extrusion process in which the solution is formed and fed to the flashing means in a single extruder, dual extrusion which involves two extruders may be used. If dual extrusion is used, the first extruder is used to melt the polymer and prepare a homogeneous solution as described above. The solution is then fed into the feed section of the second extruder which is used to cool and meter the solution to the crosshead. The second extruder can be replaced by other heat transfer/metering devices known in the art.

Still other combinations of polymer melting, solvent mixings, heat transfer and metering equipment known in the art, can be used to feed solution to the crosshead for spinning over the moving wire.

Although the foregoing discussion and the following examples are directed primarily to a single insulated conductor and the production thereof, the invention is not so limited. The ordinary artisan will recognize that multiple conductors can be assembled into a cable such as cable 5 in FIG. 2. For example, multiple conductors can be passed through the die assembly spaced apart from each other in relatively fixed positions thereby being simultaneously coated with a continuous polymer coating. Alternatively, individual insulated conductors can be assembled and held together by a variety of conventional means, including ties to form the cable.

EXAMPLES

EXAMPLE 1

A solution with the composition:

|  | Weight % |
|---|---|
| Polypropylene Homopolymer (0.7 g/10 min.) | 48.5 |
| Methylene Chloride | 42.9 |
| Freon ® 114 | 8.1 |
| Cab-O-Sil ® | 0.5 | was mixed in a 1-liter autoclave and spun over 30 AWG (0.25 mm) solid copper wire through a 0.018 in (0.46 mm) orifice at a solution temperature of 144° C. and autoclave pressure of 800 psig ($5.62 \times 10^6$ Pa). The ultramicrocellular (UMC) foam insulated wire produced had an outside diameter (OD) of 0.047–0.048 in (1.19–1.22 mm) upon exiting the die and prior to deflating. Portions of the insulated, deflated wire were post inflated (expanded) by immersing in a 20/80 by volume mixture of Freon® 114 (F-114) and methylene chloride for twenty minutes followed by immediate immersion in 60° C. water and oven drying at 60° C. for twenty minutes. The post inflated wire was pneumatic with a final measured OD of 0.047-0.049 in (1.19-1.24 mm). The post inflated wire was characterized as summarized below:

| Insulation Density (g/cc) | Avg. Cell Size (micron) | Percent Freon® | Tenacity (gpd) | Percent Elongation |
|---|---|---|---|---|
| 0.0535 | 81 | 0.61 | 1.490 | 169 |

A two foot (0.61 m) section of inflated wire was wrapped in braid and signal propagation delay measured by the pulse in-pulse out method. With a load of 100 Ω and an input rise time of 1.0 ns, the propagation delay was measured to be 1.05 ns/ft (3.44 ns/m), which is equivalent to a velocity of propagation (%V.P.) of 96.8%.

Two lengths of inflated wire were inserted into two positions of a twenty-two wire flat cable construction and their signal transmission characteristics measured. The % V.P. and capacitance were measured on 10 foot (3.05) samples. % V.P. was determined by finding the half wave resonant frequency of the sample where $$\% \ V.P. = (Freq. \times 20)/9.8425.$$

% V.P. is relative to the velocity of propagation in air.

| Electrical Results | | |
|---|---|---|
| Capacitance in pF/ft @ 10 KHz | 11.60 | 11.18 |
| (pF/m) | (38.06) | (36.68) |
| Velocity of Propagation (%) | 97.59 | 97.40 |
| Dielectric Strength (VAC) | >1000 | >1000 |

EXAMPLE 2

A 1-liter autoclave was used to prepare a solution containing (% by weight): 48% ethylene/propylene copolymer (4.0 g/10 min.), 45% methylene chloride and 7% F-114 at an autoclave pressure of 750 psig ($5.27 \times 10^6$ Pa). This solution was spun over 28 AWG (0.32 mm) solid copper wire to produce a UMC foam insulated primary wire. Sections of the insulated wire were post inflated in a 80/20 by volume mixture of $CH_2Cl_2$/F-114. The spin conditions and the properties of the UMC foam insulation are given below.

| Spin Conditions | | | Properties of UMC Foam Insulation | | | | | | |
|---|---|---|---|---|---|---|---|---|---|
| Soln. Temp. °C. | Coating rate fpm (mps) | Coated Wire Dia. in (mm) | Dens. g/cc | Ave. Cell Size μm | % Inflat. % | Inflat. Part. Press PSI (Pa) | % Voids % | Tenac. gpd | Elong. at Break % |
| 151.8 | 492 (2.50) | 0.058 (1.47) | 0.0187 | 130 | 1.33 | 0.52 ($3.59 \times 10^3$) | 97.9 | 0.740 | 93 |
| 153.1 | 143 (0.73) | 0.037 (0.94) | 0.0376 | 72 | 1.10 | 0.87 ($6.00 \times 10^3$) | 95.9 | 0.582 | 349 |

EXAMPLE 3

A solution with the composition:

| | Weight % |
|---|---|
| Polypropylene Homopolymer (0.7 g/10 min.) | 45.95 |
| Methylene Chloride | 44.46 |
| Freon® 114 | 9.49 |
| Cab-O-Sil® (0.3 parts/100 parts polymer) | 0.10 | was mixed in a 1-liter autoclave and spun over 30 AWG (0.25 mm) solid copper wire through a 0.016 in (0.41 mm) orifice at a temperature of 140° C. and autoclave pressure of 1400 psig ($9.75 \times 10^6$ Pa). The UMC foam insulated wire produced had an OD of 0.049-0.051 in (1.24-1.30 mm) after post inflation in Freon®114.

The inflated wire was inserted into a flat cable construction and the capacitance and % VP of a 10 ft (3.05 m) sample were determined to be 11.1 pF/ft (36.4 pF/m) and 98.7% respectively.

EXAMPLE 4

A solution with the composition of Example 1 was mixed in a 1-liter autoclave under a $N_2$ atmosphere and spun over 30 AWG (0.25 mm) solid copper wire through a 0.019 in (0.48 mm) orifice. The temperature of the solution in the autoclave was 143° C. at a pressure of 1300 psig ($9.06 \times 10^6$ Pa). The density of the UMC foam insulation was measured to be 0.0199 g/cc prior to post-inflation.

EXAMPLE 5

A solution with the composition:

| | Weight % |
|---|---|
| Polyethylene (0.96 g/cc; 0.85 g/10 min.) | 44.8 |
| Methylene Chloride | 49.8 |
| Freon® 114 | 5.0 |
| Cab-O-Sil® (1 part/100 parts polymer) | 0.4 |
| Nitrogen (500 psig ($3.55 \times 10^6$ Pa)) | | was mixed in a 1-liter autoclave and spun over 30 AWG (0.25 mm) solid copper wire through a 0.014 in (0.36 mm) diameter orifice. Insulated wire with diameters between 0.044 in (1.12 mm) and 0.051 in (1.30 mm) were produced. The density of the UMC form insulation prior to post-inflation with 100% Freon®114 was 0.031 g/cc. The density after post-inflation was 0.026 g/cc.

EXAMPLE 6

Example 4 was repeated using 42% by weight polypropylene homopolymer spun over 30 AWG (0.25 mm) solid copper wire through a 0.014 in (0.36 mm) orifice.

EXAMPLE 7

Example 4 is repeated using n-pentane, in place of methylene chloride, as the solvent.

EXAMPLE 8

Example 4 is repeated using Freon®11, in place of methylene chloride, as the solvent and Freon®114, in place of Cab-O-Sil® silicon dioxide, as the nucleating agent.

EXAMPLE 9

Example 4 is repeated using a hydrochlorofluorocarbon such as $CHCl_2CF_3$, in place of methylene chloride, as the solvent.

EXAMPLE 10

Example 4 is repeated using hydrofluorocarbon such as $CH_2FCF_3$, in place of Cab-O-Sil® silicon dioxide, as the nucleating agent and $CH_2FCF_3$, in place of Freon®114 as the inflatant.

EXAMPLE 11

Example 4 is repeated using a cyclic fluorocarbon such as perfluorocyclobutane ($C_4F_8$), in place of Cab-O-Sil® silicon dioxide, as the nucleating agent and $C_4F_8$, in place of Freon®114 as the inflatant.

EXAMPLE 12

Example 4 is repeated using polyvinylidene fluoride, in place of polypropylene homopolymer, as the polymer.

EXAMPLE 13

Example 4 is repeated using carbon dioxide, in place of Cab-O-Sil® silicon dioxide, as the nucleating agent and in place of $N_2$ as the atmosphere in the autoclave.

EXAMPLE 14

Example 4 is repeated using $SF_6$, in place of Freon®114, as the inflatant.

EXAMPLE 15

Example 4 is repeated using polyethylene terephtalate, in place of polypropylene homopolymer, as the polymer at a spin temperature of 200°–230° C.

EXAMPLE 16

Example 4 is repeated using polycaprolactam (nylon 6), in place of polypropylene homopolymer, as the polymer, ethanol in place of methylene chloride as the solvent and a spin temperature of 170°–210° C.

EXAMPLE 17

Example 16 is repeated without a nucleating agent and using a spin temperature of 210°–220° C.

EXAMPLE 18

Example 16 is repeated using $H_2O$, in place of ethanol, as the solvent and $CO_2$, in place of Cab-O-Sil® silicon dioxide, as the nucleating agent.

EXAMPLE 19

Example 5 is repeated using an ethylene/methacrylic acid copolymer, in place of polyethylene, as the polymer.

EXAMPLE 20

Example 5 is repeated using a neutralized ethylene/methacrylic acid copolymer, in place of polyethylene, as the polymer.

EXAMPLE 21

Example 5 is repeated using polyformaldehyde, in place of polyethylene, as the polymer.

EXAMPLE 22

Example 5 is repeated using polyurethane from ethylenebischloroformate and ethylene diamine, in place of polyethylene, as the polymer.

EXAMPLE 23

A solution with the composition:

|  | Weight % |
|---|---|
| Polyvinylchloride | 49.14 |
| (Inherent Viscosity: 0.96 in tetrahydrofuran) |  |
| Methylene Chloride | 44.23 |
| Freon ® 11 | 4.91 |
| Thermolite ® 31 Stabilizer | 1.47 |
| (3 parts/100 parts polymer) |  |
| Cab-O-Sil ® | 0.25 |
| (0.5 parts/100 parts polymer) |  |
| Nitrogen |  |
| (500 psig (3.55 × 10$^6$ Pa)) |  | is mixed to 200° C. in a 1-liter autoclave and spun at 190° C. and 1000 psig (7.00×10$^6$ Pa) over 30 AWG (0.25 mm) solid copper wire.

EXAMPLE 24

A solution with the composition:

|  | Weight % |
|---|---|
| Perfluoro-2,2-dimethyl-1,3-dioxole/ | 39.9 |
| Tetrafluoroethylene copolymer |  |
| Methylene Chloride | 59.9 |
| Cab-O-Sil ® | 0.2 |
| (0.5 parts/100 parts polymer) |  |
| Nitrogen |  |
| (500 psig (3.55 × 10$^6$ Pa)) |  | is mixed in a 1-liter autoclave to 180°–200° C. and spun over 30 AWG (0.25 mm) solid copper wire at a pressure of 1000 psig (7.00×10$^6$ Pa).

TEST PROCEDURES

The following procedures were used to determine the properties reported in the foregoing examples:

Denier—1.0 feet (0.3 m) of stripped insulation was weighed to 0.1 mg and normalized to 9,000 meters. Denier = (grams/ft)×(2.952×10$^4$ ft)/9000 meters.

Tenacity (grams per denier, gpd)—A length of stripped insulation was placed between the grips of an Instron Machine and pulled at a crosshead speed of 2 inches per minute (0.85 mm/sec). The initial jaw separation was 2.0 inches (51 mm) and the full scale load was 500 grams. Chart speed was 5.0 inches per minute (2.12 mm/sec). Tenacity was calculated by dividing the peak force in grams by the denier. Percent elongation at break was measured from the jaw separation at break, $$d_b \text{ from \% Elongation} = \frac{d_b - 2}{2} \times 100.$$

Pneumaticity (Partial Pressure of Inflatant)—The partial pressure of inflatant within the closed cells was calculated using the Ideal Gas Law, $P_i = N_i RT/V$ where $P_i$ is the partial pressure of the inflatant in psi, $N_i$ is the number of moles of inflatant, T is 298° K., V is the volume in cc, and R = 1205 cc.psig.mole.°K., and $$\text{since } N_i = \frac{\text{grams of inflatant}}{\text{inflatant mol. wt.}} = m_i/M_i,$$

$$\text{then } P_i = (1205 \cdot 298) \, m_i/(V \cdot M_i)$$

$$P_i = 3.59 \times 10^5 \, d_i/M_i, \text{ where } d_i = m_i/V$$

if the mass of inflatant, $m_i$, per mass of polymer, $m_p$, is defined as, $$C_i = m_i/m_p = d_i/d_f$$

where $d_f$ = density of the UMC foam. Then, $P_i$ is calculated from the inflatant content foam density and inflatant molecular weight according to:

$$P_i = 3.59 \times 10^5 C_i d_f/M_i$$

Velocity of Propagation (Signal Transmission Speed)—Determined by finding the half wave resonant frequency of a 10 foot (3.05 m) sample of cable. Tests were performed on a HP 8753A Network Analyzer with a 95044A Transmission Test Set. %V.P. = (Freq. × 20)/9.8425.

Propagation Delay—Measured by the pulse in-pulse out method. The devise under test was driven by a pulse generator and terminated at its far end in a resistive load equal to its normal characteristic impedance. Input and output signals were measured by using an oscilloscope probe. The time difference between the 50% voltage levels of the two signals was taken as the propagation delay. The propagation delay for the transmission of a signal in air is 1.016 ns/ft (3.34 ns/m).

Volume Percent Voids (% Voids)—The volume percent voids was calculated from the equation, $$\% \text{ Voids} = \{1 - d_f/[(1 + C_i)d_p]\}100$$

where,
$d_f$ = density of the UMC insulation
$d_p$ = density of the polymer
$C_i$ = grams of inflatant/gram of polymer
If $C_i << 1$, $$\% \text{ Voids} = (1 - d_f/d_p)100$$

Density—A buoyancy method is used to determine UMC foam densities. Small baskets are used to hold the insulation for weighing. A 190 mm OD × 100 mm deep crystallizing dish is used for the immersion bath.

Inflatant Content—Inflatant contents were measured by weighing 0.05±0.01 grams of sample before and after the cells were ruptured with heat and pressure. All samples were weighed to 1 μg and were handled with clean tweezers and disposable PVC gloves. Samples enclosed in 6 in × 6 in × 0.001 in (152 mm × 152 mm × 0.025 mm) aluminum foil were pressed for 45 seconds at a platten temperature approximately 20° C. above the melting point of the polymer and 5000 lbs. gauge (3.46 × 10⁷ Pa) pressure.

Cell Size and Cell Size Distribution—Cell size and cell size distribution were measured directly from scanning electron micrographs of the appropriate magnification.

Capacitance (Cable)—The capacitance of 10 foot (3.05 m) section of cable was measured using an HP 4262A LCR Meter.

Capacitance (Insulated Primary Wire)—The capacitance of single primary wires were measured using a SCM5 Capacitance Monitor (Electron Machine Corporation). A sample of insulated wire was passed through the cavity of the capacitance monitor which was filled with water. Care must be taken to insure that the surface of the insulated wire is completely wetted and all bubbles are eliminated. One end of the wire was grounded and a 10 KHz signal applied to the measuring head which is completely immersed in water and constitutes one arm of an AC bridge. The deviation meter was adjusted to read zero and the capacitance read directly in picofarads/foot.

TRADEMARKS

Cab-O-Sil ® is a registered trademark of Cabot Corporation, Boston, MA for a fumed amorphous silicon dioxide.

Freon ® is a registered trademark of E.I. du Pont de Nemours & Company, Wilmington, DE for fluorinated hydrocarbons, more particularly Freon ®11 designates fluorotrichloromethane ($CCl_3F$), and Freon ®114 designates 1,2-dichloro-1,1,2,2-tetrafluoroethane ($CClF_2CClF_2$).

Thermolite ® is a registered trademark of M & T Chemicals, Rahway, N.J. for tin-organic stabilizers.

It is to be understood that the forms of the invention described herein are but preferred embodiments and various changes may be made without departing from the spirit and scope of the invention.

We claim:

1. An electrically insulated conductor comprising an electrically conductive element surrounded by ultramicrocellular foamed polymer insulation having a void volume greater than about 75%, wherein the velocity of propagation of the insulated conductor is greater than 90% of the speed of light.

2. The electrically insulated conductor of claim 1 wherein the foamed polymer insulation has a void volume of greater than 85%.

3. The electrically insulated conductor of claim 2 wherein the foamed polymer insulation has a void volume of greater than 94%.

4. The electrically insulated conductor of claim 3 wherein the velocity of propagation of the insulated conductor is greater than 95% of the speed of light.

5. The electrically insulated conductor of claim 4 wherein the polymer is selected from the group consisting of polyethylene, polypropylene, poly(ethylene terephthalate) and copolymers thereof.

6. The electrically insulated conductor of claim 5 wherein the conductive element is a wire having a median diameter of about 0.006 inch to about 0.013 inch.

7. A cable comprising a plurality of electrically conductive elements each surrounded by ultramicrocellular foamed polymer insulation having a void volume greater than about 75%, wherein the velocity of propagation of the insulated conductor is greater than 90% of the speed of light.

8. The cable of claim 7 wherein the foamed polymer insulation has a void volume of greater than 85%.

9. The cable of claim 8 wherein the foamed polymer insulation has a void volume of greater than 94%.

10. The cable of claim 9 wherein the velocity of propagation of the insulated conductor is greater than 95% of the speed of light.

11. The cable of claim 10 wherein the polymer is selected from the group consisting of polyethylene, polypropylene, poly(ethylene terephthalate) and copolymers thereof.

12. The cable of claim 11 wherein each conductive element is a wire having a median diameter of about 0.006 inch to about 0.013 inch.

* * * * *